United States Patent [19]
Byrnes

[11] 4,076,441
[45] Feb. 28, 1978

[54] ANNULAR CUTTING DIE, AND METHOD OF CIRCUMFERENTIALLY SHAVING AWAY THE SURFACE PORTION OF A ROD

[75] Inventor: Joseph Edward Byrnes, Fairfield, Conn.

[73] Assignee: General Electric Company, New York, N.Y.

[21] Appl. No.: 726,942

[22] Filed: Sep. 27, 1976

[51] Int. Cl.² .............................................. B26D 1/00
[52] U.S. Cl. ..................................... 407/64; 407/115; 29/33 R; 29/33 F; 90/24 D; 90/24 E
[58] Field of Search ................ 29/95.1, 103 R; 82/20; 29/33 R, 33 F, 33 T; 164/86

[56] References Cited

U.S. PATENT DOCUMENTS

| | | | |
|---|---|---|---|
| 1,361,568 | 12/1920 | Donaldson | 29/95.1 |
| 2,233,928 | 3/1941 | Weaver | 29/33 R |
| 3,060,054 | 10/1962 | Russell et al. | 164/86 X |

FOREIGN PATENT DOCUMENTS

| | | | |
|---|---|---|---|
| 44,702 | 3/1909 | Switzerland | 29/103 R |

*Primary Examiner*—Leonidas Vlachos
*Attorney, Agent, or Firm*—R. G. Simkins; P. L. Schlamp; F. L. Neuhauser

[57] ABSTRACT

An improved annular cutting die for shaving the surface from metal rods or base, having four facets in the outer annular cutting surface thereof.

12 Claims, 4 Drawing Figures

ANNULAR CUTTING DIE, AND METHOD OF CIRCUMFERENTIALLY SHAVING AWAY THE SURFACE PORTION OF A ROD

BACKGROUND OF THE INVENTION

This invention relates to an annular cutting die for shaving metal rods or bar stock of the type disclosed in U.S. Pat. No. 2,233,928, issued Mar. 4, 1941, and comprises an improvement in such annular cutting dies, and also an improved method of circumferentially shaving or cutting away the peripheral surface portions from metal rods or bar stock.

Annular cutting dies of the type to which this invention relates are used to cut or shave away the peripheral surface portions from metal rods or bar stock thereby to provide such rods or bars with clean surfaces free of oxides or other contaminants and thus better prepared for subsequent processing, such as in the manufacture of wire for electrical conductors as set forth in the aforesaid U.S. Pat. No. 2,233,928, or for the preparation of core or seed rod for continuous metal casting operations such as disclosed in U.S. Pat. No. 3,060,054, and related U.S. patents.

In that this invention comprises improvements in the apparatus and method disclosed in the aforesaid U.S. patents, the disclosures of said U.S. Pat. Nos. 2,233,928 and 3,060,054 are expressly incorporated herein by reference.

Prior art annular cutting dies for this service, such as those shown in U.S. Pat. No. 2,233,928, were designed and constructed with six, or possibly more, facets or surface portions of distinctive geometric planes formed within the conical face or outer annular tapered surface or side of the annular cutting blade, which in turn provided six, or more, approximately equally spaced radially extending cutting edges about the annular cutting blade. The six facet annular die in its designed mode of operation of circumferentially cutting or shaving away the peripheral surface portion from around a metal rod or bar while such rod or bar is moving continuously through the annular die, has been found not to be stable or consistent in its performance, due apparently to uneven rates of wear, among other disadvantages in its use. Specifically, the conventional prior art six facet annular cutting die in operation initially splits the peripheral surface portion which is being, or has been, circumferentially cut or shaved away from the rod or bar into three discrete longitudinal sections or shavings that are each in the shape or configuration of an adjoined or double arcuate unit or portion in cross section, such as shown in FIG. 3 of the drawing.

However, as the six facet annular die wears due to use, the changing dimensions or configuration of the die working areas appear to cause one or more of the said adjoined or double arcuate units or portions of the original three longitudinal sections or shavings, to splinter or break into two individual arcuate units or strips whereby the cutting or shaving operation then proceeds with the circumferential cut or shaved away peripheral surface portion thereafter being separated into four, or five, or six, arcuate longitudinal sections or shavings in an irregular and uncontrollable sequence. Furthermore, the three longitudinal sections or shavings of a double or adjoined arcuate unit or portion, which are initially produced by the six faceted annular die from the circumferentially cut or shaved away peripheral surface portion of the rod, each assume an individual direction or angle of movement or egress away from the cutting edge of the blade of the annular cutting die and travel therefrom over the outer face of the blade. These assumed paths or courses of travel as the cut away sections or shavings move away from the blade of the cutting die introduce and establish areas or patterns of abrasion and in turn cause wear or erosion in the annular cutting die, which conditions adversely influence the rates and unevenness of wear therein. The subsequent splintering or breaking of one or more of the said initial three longitudinal double arcuate sections or shavings derived from the circumferentially cut away peripheral surface portion into two fragments of individual arcuate units or portions often results in one of the separated arcuate units of portions assuming a different direction or angle of movement or egress away from the cutting edge of the blade of the annular die and over the outer face of the blade. This diversion of a path of travel of the splintered or separated arcuate unit or units and its new pattern of abrasion appears to accelerate the degree of unevenness of wear or erosion as well as the rate of wear.

SUMMARY OF THE INVENTION

This invention comprises the discovery that an annular cutting die of the type described, having four facets formed in its outer annular surface of its cutting blade, rather than the six or more facets in such annular cutting dies of the prior art, performs in a unique and advantageous manner. Specifically, the four facet annular cutting die of this invention consistently splits or divides the circumferentially cut away peripheral surface portion of a rod or bar into exactly four substantially uniform longitudinal sections or shavings throughout its service life or full term of use, regardless of wear. Moreover, each of the four longitudinal sections or shavings throughout its service life or full term of use, regardless of wear. Moreover, each of the four longitudinal sections or shavings produced by the four facet annular cutting die of this invention is substantially flat and rectangular in cross section, such as shown in cross section in FIG. 4 of the drawing.

This highly stable operation or consistent formation of four substantially uniform longitudinal sections or shavings of flat, rectangular cross section attributable to the distinctive construction of the die of this invention overcomes many of the disadvantages of the former unstable or irregular and detrimental performance of the prior art six facet annular cutting dies. For esample, the flat, rectangular longitudinal sections or shavings formed with the four facet die of this invention can each be easily and precisely measured and their relative dimensions or thicknesses compared as a means of quickly and accurately determining the degree of concentricity of the annular die with respect to the rod or bar being passed therethrough and thus circumferentially cut or shaved, and with the overall apparatus. This accurate determination of degree of concentricity enables the effecting of any apt or needed correction in the positioning of the annular die to achieve a precise centering of the die with respect to the rod and the other components of the overall apparatus. Additionally, the flat, rectangular longitudinal sections or shavings of the circumferentially cut away peripheral surface portion of the rod or bar formed by the novel die of this invention comprise flat band-like strips which are easy to collect and compactly package such as by tightly winding about itself or on a spool-like device, whereas the arcuate or bow shaped longitudinal sections or shavings produced by the former six faceted annular dies had a propensity of self-contortion and irregular entwinement on itself, rendering them difficult to collect and handle, and imposing a need for compression compacting for expeditious handling and recycling.

Furthermore, the stable performance of the four facet annular cutting die of this invention with its consistent formation of only four longitudinal sections or shavings from the circumferentially cut away peripheral surface portion of the rod effectively precludes any possibility of the adverse effects attributable to the subsequent splintering or breaking of each of the longitudinal sections or shavings emanating from the die into two parts and thus an increase in their number. This in turn precludes the shifting of the direction or angle of movement or egress of the paths of the cut away section or shavings moving from the cutting portion of the annular die and as a result thereof the likelihood of uneven or accelerated abrasion and wear in the die.

OBJECTS OF THE INVENTION

It is a primary object of this invention to provide an annular cutting die for the circumferential cutting or shaving away of the peripheral surface portion of a rod or bar passed therethrough which is of a new and improved structure and performance, and a method of circumferentially cutting or shaving with the same.

It is also a primary object of this invention to provide an annular cutting die that consistently splits or divides the peripheral surface portion of the rod or bar which is circumferentially cut or shaved therefrom into exactly four longitudinally extending sections or shavings throughout the entire service life or term of performance of the die.

It is a further object of this invention to provide such an annular cutting die that constantly splits or divides the peripheral surface portion of the rod or bar which it circumferentially cuts or shaves therefrom, into four substantially uniform longitudinally extending sections or shavings of flat configuration and rectangular cross section during the entire service life or term of performance of the die.

It is a still further object of this invention to provide an annular cutting die which consistently forms the same, or an unchanging, number of longitudinal sections or shavings of circumferential cut or shaved away peripheral surface portions from a rod or bar, and thereby precludes the changing or shifting of the direction or angle of movement of the paths of the longitudinal sections or shavings moving or egressing from the annular die.

It is an additional object of this invention to provide an annular cutting die for the circumferential cutting or shaving away of the peripheral surface portion of a rod or bar passing therethrough, having four facets on the outer annular surface of the annular cutting blade which thereby provides unique and improved stable performance.

DESCRIPTION OF A PREFERRED EMBODIMENT

Figure 1:
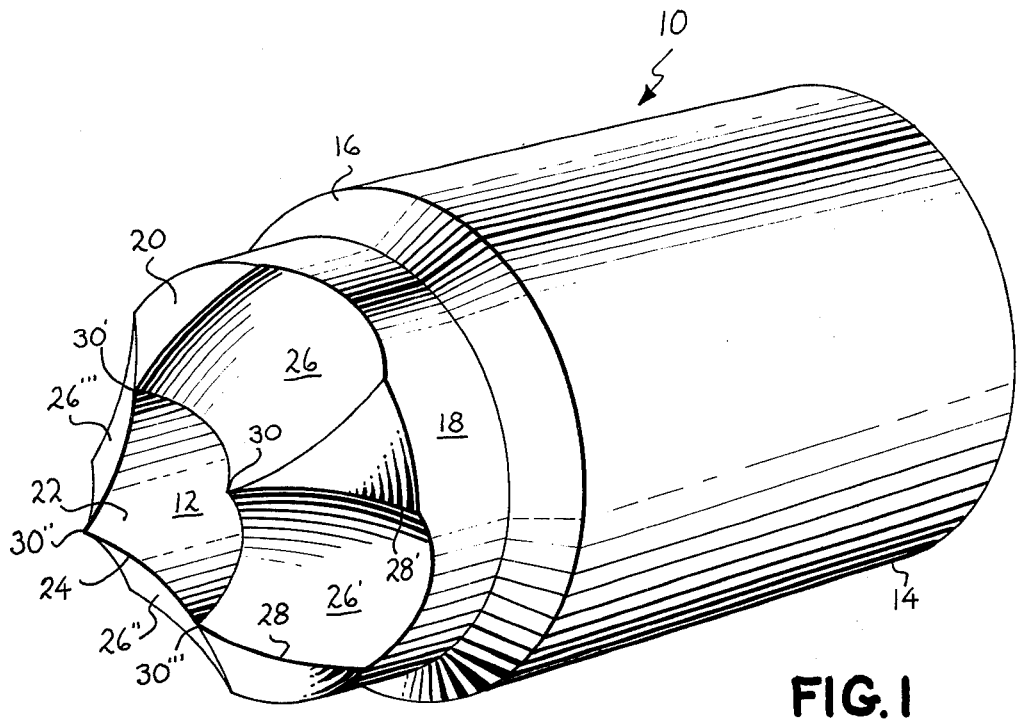
FIG. 1 of the drawing comprises a perspective view of the new and improved annular cutting die of this invention.
Figure 2:
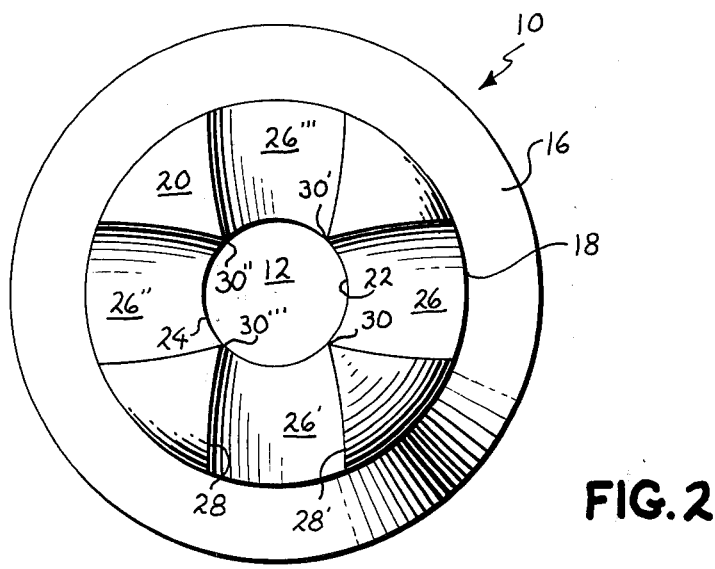
FIG. 2 is an end view of the new and improved annular cutting die of this invention, illustrating the arrangement of the four facets in the outer annular surface of the annular cutting blade thereof.
Figure 3:
FIG. 3 is a cross-sectional view of a longitudinal section or shaving produced by the prior art six facet annular die.

Referring to the drawing, the annular cutting die member 10, comprises a generally hollow cylindrical or sleeve-like body such as in the prior art embodiment illustrated in the above noted U.S. Pat. Nos. 2,233,928 and 3,060,054. The die member 10 is provided with an internal axial passage 12 extending lengthwise therethrough for the movement of a rod or bar through the die to thereby circumferentially impose the annular cutting means or blade of the die member 10 into the peripheral surface portion of the rod or bas as it moves through the passage 12 of the die member 10.

Annular cutting die member 10, as is conventional, is preferably provided with a slightly tapered base portion 14 to facilitate its secure mounting and centering in a supporting base (not shown). The tapered base portion enables the die member 10 to be centrally wedged securely in a fixed position by means of the opposing direction of the force attributable to the mechanical effort applied to advance a rod or bar through the annular cutting means comprising an annular blade or knife edge of smaller diameter than the overall diameter of the rod or bar forced therethrough.

Additionally, the axial internal passage 12 extending through the die member 10 is appropriately tapered or flared outward away from the annular cutting blade to facilitate the unencumbered passage of the rod or bar through the balance of the die member after the circumferential cutting or shaving away of the peripheral surface portion thereof by the annular cutting blade of the die member is effected.

In a preferred and conventional embodiment of the annular cutting die, the end of the die member 10 containing the annular cutting means or blade, is formed with a reduced area or necked-down section such as is provided by a shoulder 16 and the head portion 18 of smaller diameter than the remainder of the die member body. This arrangement provides ample mass for great strength in the die base 14, while also providing a reduced or minimal surface area for exposure to rubbing or abrading contact by the movement of the cut away portions or shavings passing thereover from the cutting blade, to thereby minimize abrasion, wear, and heat generated due to friction.

Head portion 18 of the annular cutting die member 10 is provided with an outer annular tapered surface 20, and an inner annular tapered surface 22 which converge upon each other at the one axial end to form an annular cutting blade 24 axially projecting from the head portion 18 of the die member 10 and providing a leading end thereon. Annular cutting blade 24 is designed to be constructed of a suitably smaller circumference or diameter than the overall outer diameter of the rods or bars which are to be circumferentially cut or shaved whereby the movement of such rods or bars centrally through the internal passage 12 of the die member in a direction counter to the leading end with the axially projecting annular cutting blade 24 results in the peripheral surface portions of the rods or bars being circumferentially cut or shaved away.

In accordance with the improvement of this invention, and unlike the comparable prior art annular cutting dies, four facets, 26, 26', 26", 26''', are provided in the face of the outer annular tapered surface 20 approximately equally or symmetrically spaced thereabout, and generally radially extending thereon from the annular cutting blade 24.

The four facets, 26, 26', 26", and 26''', can be formed in the face of the outer annular tapered surface 20 by machining or grinding the conical face or plane of said annular tapered surface 20 to a flat plane or concave contour, or of another distinctive contour differing from that of the conical face or plane of the outer annular tapered surface 20. The four facets are formed in four corresponding or symmetrical areas on the face of the outer annular tapered surface 20 of approximately equal expanse and radial spacing around the central passage 12 and annular cutting blade 24. Additionally, the four facets, 26, 26', 26", and 26''', must be provided in the outer annular tapered surface 20 of the annular cutting blade 24 with each of said facets having a pair of generally parallel borders, 28-28', extending outward on the face of the surface 20 from the annular cutting blade 24 and with each border 28 of the pair of borders for all facets adjoining the border 28 of another facet 26 at a location adjacent to the annular cutting blade 24. Thus the adjoining borders 28 of the facets 26 on the face of the outer annular tapered surface 20 adjacent to the annular cutting blade 24, provide four cutting or splitting edges or wedges 30, 30', 30", 30''', substantially equally spaced about the annular cutting blade 24 and projecting therefrom in a generally radial direction on the face of the outer annular tapered surface 20.

Accordingly, in the practice of this invention, the movement of a metal rod or bar of larger overall diameter approximately concentrically through the internal axial passage 12 of the annular cutting die member 10 in a direction opposing the axially projecting annular cutting blade 24 of a smaller circumference of diameter, results in the circumferential cutting or shaving away of the peripheral surface portion of the rod or bar.

Figure 4:
FIG. 4 is a cross-sectional view of a longitudinal section or shaving produced by the novel four facet annular die of this invention.

However, the distinctive construction of the discovery of this invention in the above described annular cutting die specifically having four facets aptly arranged in the face of the outer annular tapered surface forming one side of the annular cutting blade, provides many new and improved performance conditions or advantageous results thereof, unlike the operation of the annular cutting dies of the prior art having six or possibly more facets therein. Specifically, the four facet annular cutting die of this invention consistently splits the circumferentially cut or shaved away peripheral surface portion of a rod or bar moving therethrough into four longitudinal sections or shavings which are of a flat configuration and rectangular cross section, as shown in FIG. 4 of the drawing, from the time of its initial use and thereafter throughout its entire service life or term of operation. Moreover, the stable performance attributable to the unique construction of the annular cutting die of this invention precludes the changing or shifting of the direction of angle of movement or egress for the path of the longitudinal sections or shavings away from the annular cutting blade.

Although the invention has been described with reference to certain specific embodiments thereof, numerous modifications are possible and it is desired to cover all modifications falling within the spirit and scope of this invention.

What I claim as new and desire to secure by Letters Patent of the United States is:

1. An annular cutting die for the circumferential shaving away of the surface portion of a rod passing therethrough, comprising an annular body having an outer annular tapered surface and an inner annular tapered surface which converge to form an annular cutting blade, said outer annular tapered surface of the blade having four substantially symmetrical, radially extending facets formed therein with each of the borders of each of said facets adjoining a border of the next adjacent facet of the annular cutting blade to thereby provide four splitting edges substantially equally spaced about the annular cutting blade.

2. The annular cutting die of claim 1, wherein the four substantially equally spaced splitting edges extend radially on the outer annular tapered surface of the annular cutting blade.

3. An annular cutting die for the circumferential shaving away of the surface portion of a rod passing therethrough, comprising an annular body having an outer annular tapered surface and inner annular tapered surface which converge to form an axially projecting annular cutting blade, said outer annular tapered surface having four substantially symmetrical, radially extending facets formed therein with each of the borders of each of said facets adjoining a border of the next adjacent facet of the annular cutting blade to thereby provide four axially projecting splitting edges substantially equally spaced about the annular cutting blade.

4. The annular cutting die of claim 3, wherein the four substantially equally spaced splitting edges extend radially on the outer annular tapered surface of the annular cutting blade.

5. The annular cutting die of claim 4, wherein the facets formed in the outer annular tapered surface of the annular cutting blade comprise areas having a flat plane surface.

6. The annular cutting die of claim 4, wherein the facets formed in the outer annular tapered surface of the annular cutting blade comprise areas having a concave surface.

7. An annular cutting die for the circumferential shaving away of the surface portion of a rod passing therethrough, comprising an annular body having an outer annular tapered surface and inner annular tapered surface which converge to form an axially projecting annular cutting blade, said outer annular tapered surface having four substantially symmetrical, radially extending facets formed therein with each of the borders of each of said facets adjoining a border of the next adjacent facet of the annular cutting blade to thereby provide four axially projecting splitting edges substantially equally spaced and radially extending about the annular cutting blade.

8. The annular cutting die of claim 7, wherein the facets formed in the outer annular tapered surface of the annular cutting blade comprise areas having a flat plane surface.

9. The annular cutting die of claim 7, wherein the facets formed in the outer annular tapered surface of the annular cutting blade comprise areas having a concave surface.

10. A method of circumferentially shaving away the peripheral surface portion of a rod as to form four discrete longitudinally extending shave sections, comprising providing an annular cutting die of a smaller circumference than the rod to be shaved, said cutting die comprising an annular body having an outer annular tapered surface and inner annular tapered surface which converge to form an annular cutting blade, with said outer annular tapered surface having four substantially symmetrical, radially extending facets formed therein with each of the borders of each of said facets adjoining a border of the next adjacent facet of the annular cutting blade to thereby provide four splitting edges substantially equally spaced about the annular cutting blade, and passing a rod through said die to circumferentially cut away the peripheral surface portion from around the rod passing through the annular die and split the circumferentially cut away peripheral surface portion of the rod into said four discrete longitudinally extending shave sections.

11. A method of circumferentially shaving away the peripheral surface portion of a rod as to form four discrete longitudinally extending shave portions, comprising providing an annular cutting die of a smaller circumference than the rod to be shaved, said cutting die comprising an annular body having an outer annular tapered surface and inner annular tapered surface which converge to form an axially projecting annular cutting blade, with said outer annular tapered surface having four substantially symmetrical, radially extending facets formed therein, and with each of the borders of each of said facets adjoining a border of the next adjacent facet of the annular cutting blade to thereby provide four axially projecting splitting edges substantially equally spaced about the annular cutting blade, and passing a rod through said die to continuously circumferentially cut away the peripheral surface portion from around the rod continuously passing through the annular die and split the circumferentially cut away peripheral surface portion into four discrete longitudinally extending shave sections.

12. A method of circumferentially shaving away the peripheral surface portion of a rod as to form four discrete longitudinally extending shave portions, comprising providing an annular cutting die of a smaller circumference than the rod to be shaved, said cutting die comprising an annular body having an outer annular tapered surface and inner annular tapered surface which converge to form an axially projecting annular cutting blade, with said outer annular tapered surface having four substantially symmetrical, radially extending facets formed therein, and with each of the borders of each of said facets adjoining a border of the next adjacent facet of the annular cutting blade to thereby provide four axially projecting splitting edges substantially equally spaced and radially extending about the annular cutting blade, and passing a rod through said die substantially concentrically to circumferentially cut away the peripheral surface portion from around the rod passing through the annular die and split the circumferentially cut away peripheral surface portion of the rod into four discrete longitudinally extending shave sections of approximately equal size.

* * * * *